Nov. 26, 1946.   W. J. KEHL   2,411,544
ROTARY SCRAPER
Filed Feb. 26, 1945   2 Sheets-Sheet 2

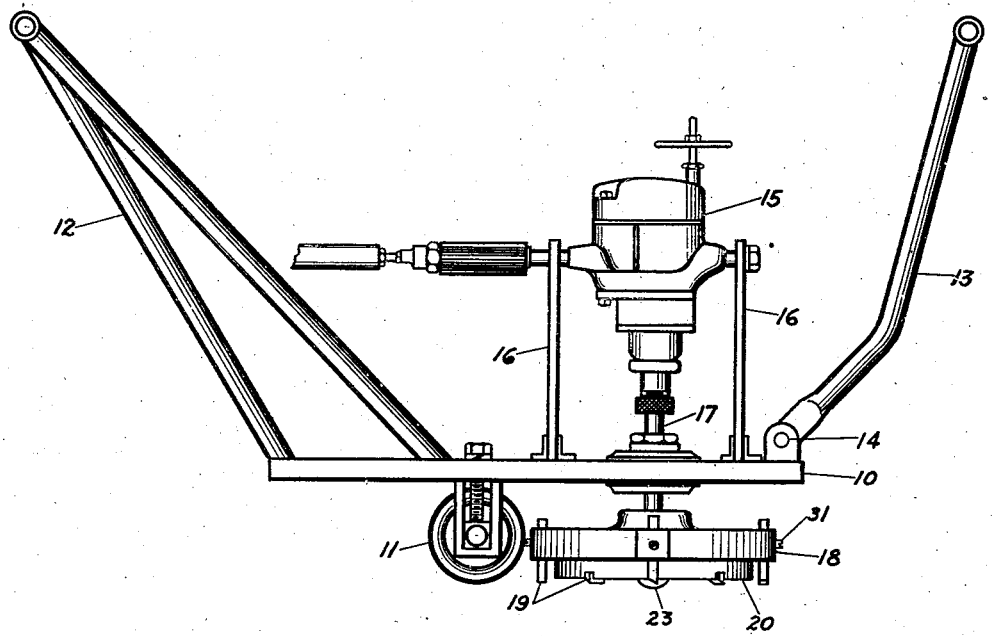
Fig. 1
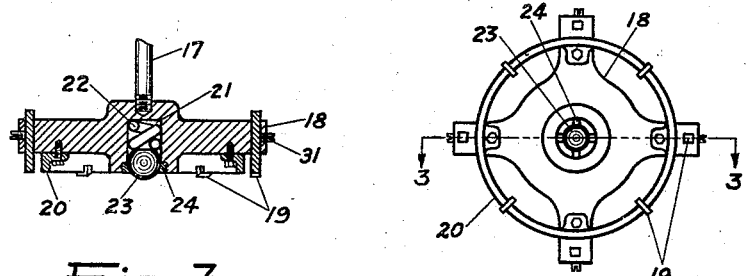
Fig. 3
Fig. 2
INVENTOR.
William J. Kehl

INVENTOR.
William J. Kehl
BY
Ralph L. Chappell
ATTORNEY.

Patented Nov. 26, 1946

2,411,544

UNITED STATES PATENT OFFICE 2,411,544

ROTARY SCRAPER

William J. Kehl, New York, N. Y.

Application February 26, 1945, Serial No. 579,818

3 Claims. (Cl. 144—115)

(Granted under the act of March 3, 1883, as amended April 30, 1928; 370 O. G. 757)

This invention relates to a rotary scraper, particularly useful in scraping, cleaning and leveling surfaces, such as floors. Machine shop floors, for example, tend to accumulate coatings of dirt, grease, and other extraneous matter which constitute a safety hazard to workers. Such floors, particularly if made of wood, tend to wear and become uneven in time, presenting so called hills and valleys for the accumulation of dirt and grease which tend to induce fatigue in those who walk and stand thereon. Even concrete floors have or develop surface irregularities which accumulate dirt and contribute to fatigue.

One object of the subject invention is to provide a rotary scraper capable of effectively removing such accumulations of dirt, grease and the like from surfaces, such as floors.

Another object of this invention is to provide a rotary scraper for leveling and removing surface irregularities from surfaces, such as floors of wood, concrete, steel or other materials.

Still another object of the present invention is to provide a machine for simultaneously cleaning and leveling working surfaces such as floors.

A still further object of the invention is to provide a rotary scraper comprising adjustable means whereby to control the depth at which said scraper will effectuate the leveling and removing of surface irregularities from surfaces such as floors.

Though the invention is capable of numerous modifications and embodiments, it may be fully understood by reference to the accompanying drawings in which:

Figure 1 is a side view in elevation of the machine of this invention.

Figure 2 is a bottom view of the rotatable cutter head assembly of the machine of Figure 1.

Figure 3 is a sectional view of the cutter head assembly taken along the line 3—3 in Figure 2.

Figure 4:
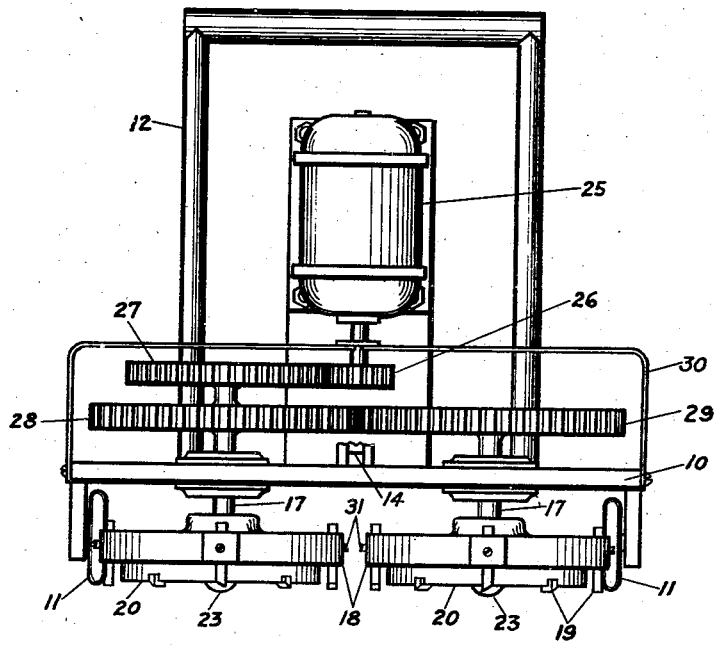
Figure 4 is a front view in elevation of a modification of the machine of this invention, comprising two rotatable scraper head assemblies.

Referring to the drawings in detail, the scraper machine is mounted on a platform 10 of steel or other suitable material, supported in part by two wheels or casters 11. Welded or otherwise affixed to the rear end of platform 10, a rigid framework 12 is provided for enabling moving the machine about. Handle 13 swiveled on pin 14 is provided at the front end of platform 10 for pulling the machine.

Mounted above the platform 10 is a motor 15. In the example illustrated in Figure 1, a pneumatic motor is shown, although it will be apparent that an electric motor, gas engine or other suitable source of power may be utilized. Motor 15 is rigidly supported on the platform 10 by brackets 16. Motor 15 drives shaft 17 which extends downwardly through the platform 10 and provides rotation to a cutting head assembly 18. The cutting head assembly 18 is provided with four radially disposed arms (Figure 2) on each of which is adjustably mounted a cutting tool 19. Rigidly and suitably secured to said arms of the cutting head assembly 18 is a ring 20, which is provided with four additional and similar cutting tools 19. Said cutting tools 19 are securely held in place, preferably by set screws 31, or may be welded in place as shown in association with ring 20, as desired. The tools 19 may be carbide cutting tools or may be made of high speed tool steel or other suitable material.

The hub of said assembly 18 is provided with an open ended annular chamber or recess 21 within which is disposed a short length of a compression spring 22. A hardened steel ball 23 is adapted to be adjustably retained in the open end of said recess and have a pressure relation upon said spring by means of a threaded retaining ring or collar 24 in threaded engagement with the open end of said recess.

Figure 4 illustrates a modification of the said invention wherein two such cutting head assemblies 18 are provided. In this instance, the source of power may be an electric motor 25 suitably mounted on the platform 10. Said motor has a driving connection with a pinion 26 which engages and drives gear 27. Gear 27 is axially connected to a gear 28, which engages and drives associated gear 29. Shafts 17—17 which are driven by said gears 28 and 29 extend downwardly through said platform 10 and rotatably drive the cutting head assemblies 18—18 in opposite directions. Gears 26, 27, 28, 29 may be inclosed for safety reasons by a gear shield or enclosure 30.

In operation, the machine is initially rolled onto a section of the area to be cleaned or scraped and it will be understood that the supporting ball 23 may act as a wheel in partially supporting the forward weight of the machine for the purpose of keeping the tools 19 away from the clear of the work surface. The number of cutting or scraping tools 19 mounted on the cutting head assembly 18 may be varied in number. In the drawings, eight such tools are shown mounted in an assembly head. However, more or less may be provided, as desired. The cutting edges of said tools should all be adjustably leveled to a plane tangent to the lower edges of the wheels 11. The ball 23 is adjustably positioned by the threaded collar 24 so that the ball protrudes a sufficient distance beyond the edges of the tools 19 to keep said tools clear of the work when the machine is being moved over comparatively smooth surfaces. To clear the tools in traversing rough areas the cutting head assembly 18 may be tilted away from the work entirely by applying manual pressure downward on the framework 12, resulting in the machine resting on the wheels 11 alone as the machine is being moved about.

Figure 5:
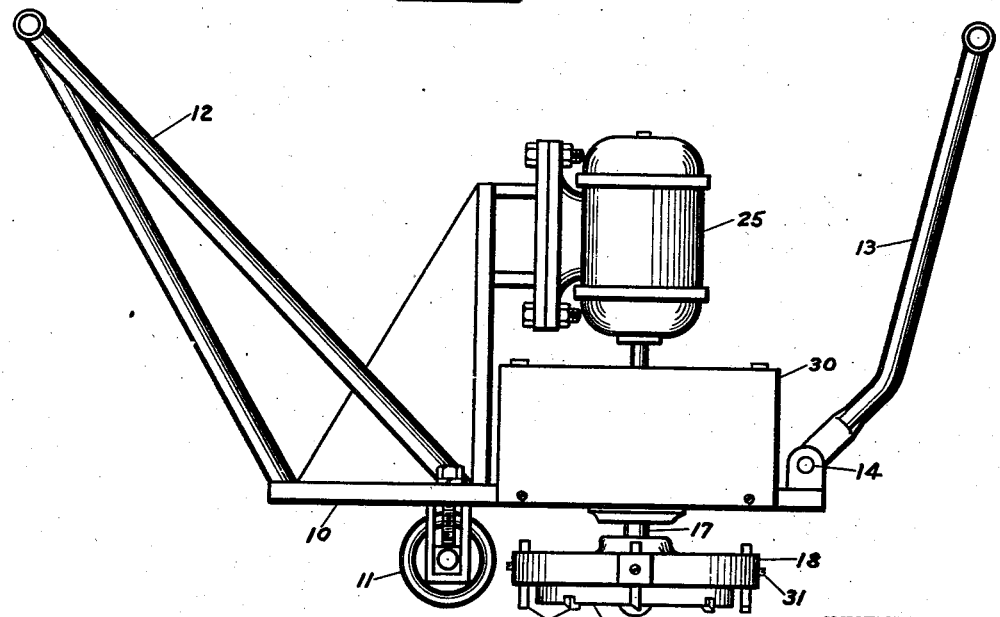
Figure 5 is a side view of the machine of Figure 4.

When the motor 15 has been started the rotating cutting tools 19 are brought into contact with the work surface by compressing the spring 22 behind the ball 23 by the operator exerting downward pressure on the platform 10 through the handle 13 or by simply placing weights on the platform 10. These weights also serve to create an added constant pressure of the machine and tools upon the work surface, if desired. Besides serving to hold certain of the tools 19 ring 20, in conjunction with the ball 23, serves to additionally regulate and limit the depth of the cut of the tools 19 into the surface being worked upon by contacting and riding upon any high spots of said surface. The form of said invention having a single cutting head assembly 18 is most useful for working small or irregularly bounded areas. The modification illustrated herein demonstrates the employment of two contra-rotating cutting head assemblies (see Figures 4 and 5). The use of multiple cutter heads has an advantage of covering the area being worked upon at a greater rate, and with the employment of two contra-rotating heads, there is eliminated any tendency toward a possible torque condition through the use of a single head assembly. It will be apparent that greater numbers of cutter head assemblies may be incorporated into the machine of this invention.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A rotary scraping machine comprising a platform, a motor rigidly mounted on said paltform, two cutting head assemblies mounted below said platform, means for causing said cutting head assemblies to be rotated in opposite directions by said motor, a plurality of high speed cutting tools mounted peripherally of said cutting head and projecting downward, a ring affixed to the lower surface of each of said cutting heads and centered about its axis, each ring having a plurality of high speed cutting tools set peripherally therein and projecting downward, the cutting edges of all the tools in the said cutting head assemblies, including the rings, lying in a common plane, a spring-mounted steel ball projecting below each of the said cutting head assemblies at its center and projecting beyond the plane of the cutting edges of said tools, a collar retaining each of said balls in its respective cutting head assembly, and a pair of co-axial wheels mounted below said platform and supporting it, the lower edge of said wheels being tangent to the plane of the cutting edges of the tools.

2. A rotary scraping machine comprising a platform, affixed handles for moving said platform, a motor rigidly mounted on said platform, the shaft of said motor extending downward through said platform, a cutting head assembly fixed on the end of said shaft, a plurality of high speed cutting tools mounted peripherally of said cutting head and projecting downward, a ring affixed to the lower surface of said cutting head and centered about its axis, said ring having a plurality of high speed cutting tools set peripherally therein and projecting downward, the cutting edges of all the tools in said cutting head assembly, including the ring, lying in a common plane, a spring-mounted steel ball projecting below the cutting head at its center and projecting beyond the plane of the cutting edges of said tools, a collar adjustably retaining said ball in said cutting head, and a pair of co-axial wheels mounted below said platform and supporting it, the lower edge of said wheels being tangent to the plane of the cutting edges of said tools.

3. A rotary scraping machine comprising a platform, affixed handles for moving said platform, a pneumatic motor rigidly mounted on said platform, the shaft of said motor extending downward through said platform, a cutting head assembly fixed on the end of said shaft, said cutting head being provided with four radially disposed arms, a high speed cutting tool adjustably mounted in each arm and projecting downward, a ring affixed to the lower surface of said cutting head and centered about its axis, said ring having four high speed cutting tools set therein and projecting downward, the cutting edges of all the tools in said cutting head assembly arms and ring lying in a common plane, a spring-mounted hardened steel ball projecting below the cutting head at its center and projecting beyond the plane of the cutting edges of said tools, a collar adjustably retaining said ball in said cutting head, and a pair of co-axial wheels mounted below said platform and supporting it, the lower edge of said wheels being tangent to the plane of the cutting edges of said tools.

WILLIAM J. KEHL.